United States Patent
Soga

(10) Patent No.: US 7,621,845 B2
(45) Date of Patent: Nov. 24, 2009

(54) OIL PRESSURE SUPPLY DEVICE

(75) Inventor: Yoshinobu Soga, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 86 days.

(21) Appl. No.: 12/038,003

(22) Filed: Feb. 27, 2008

(65) Prior Publication Data

US 2008/0207396 A1    Aug. 28, 2008

(30) Foreign Application Priority Data

Feb. 27, 2007    (JP)    ............................. 2007-046973

(51) Int. Cl.
  F16H 61/16  (2006.01)
  F16H 37/02  (2006.01)
  F16H 61/26  (2006.01)
(52) U.S. Cl. .................. 477/125; 477/127; 475/209
(58) Field of Classification Search .............. 477/125, 477/126, 127, 130, 156; 475/127, 128, 208, 475/209; 192/3.52, 3.54, 3.57
See application file for complete search history.

(56) References Cited

U.S. PATENT DOCUMENTS

| 5,776,028 A | * | 7/1998 | Matsuda et al. | ............... 477/45 |
| 6,612,958 B2 | * | 9/2003 | Imai et al. | ................... 475/210 |
| 7,128,688 B2 | * | 10/2006 | Katou | ........................ 477/98 |
| 2003/0083169 A1 | * | 5/2003 | Iwata et al. | ................. 475/208 |
| 2003/0119618 A1 | * | 6/2003 | Iwata et al. | ................. 475/127 |

FOREIGN PATENT DOCUMENTS

JP    3-213773 A    9/1991

* cited by examiner

Primary Examiner—Roger Pang
(74) Attorney, Agent, or Firm—Sughrue Mion, PLLC

(57) ABSTRACT

An oil pressure control circuit includes an oil pump for outputting an oil pressure from each of a first port and a second port, a lockup control valve for making a switchover between a state in which a secondary pressure is supplied to an engagement-side oil chamber of a torque converter and a state in which a secondary pressure is supplied to a release-side oil chamber of the torque converter, in accordance with an oil pressure supplied from a first solenoid valve, a garage shift control valve for maintaining a supply source of an oil pressure when an oil pressure is supplied from the first solenoid valve, and a port switchover valve for shutting off the first port of the oil pump from a line-pressure oil passage when an oil pressure is supplied from each of both the first solenoid valve and a second solenoid valve.

5 Claims, 4 Drawing Sheets

OIL PRESSURE SUPPLY DEVICE

INCORPORATION BY REFERENCE

The disclosure of Japanese Patent Application No. 2007-046973 filed on Feb. 27, 2007 including the specification, drawings and abstract is incorporated herein by reference in its entirety.

BACKGROUND OF THE INVENTION

1. Field of the Invention

The invention relates to an oil pressure supply device, and more particularly, to an oil pressure supply device having an oil pump for supplying an oil pressure to an oil passage from a plurality of ports.

2. Description of the Related Art

There is known a vehicle mounted with a hydraulically actuated transmission. An oil pressure used to actuate the transmission is supplied from an oil pump. The oil pump is driven by, for example, an engine. Accordingly, when the amount of oil discharged from the oil pump is large, the amount of energy loss is correspondingly large. On the other hand, when the amount of oil discharged from the oil pump is small, the oil pressure needed to actuate the transmission is insufficient. Thus, there is proposed an oil pressure control device having an oil pump with a plurality of ports for discharging oil to allow the amount of oil discharged from the oil pump to be changed.

Japanese Patent Application Publication No. 3-213773 (JP-A-3-213773) discloses an oil pressure control device of a continuously variable transmission that is capable of changing the amount of oil from an oil pump. The oil pressure control device described in Japanese Patent Application Publication No. 3-213773 (JP-A-3-213773) has at least a plurality of discharge ports. All but one of the discharge ports are equipped with check valves and/or solenoid valves respectively. The oil pressure control device includes an oil pump capable of selecting load operation or no-load operation, and a control unit for comparing a required amount of oil in the continuously variable transmission, a torque converter, and the like with a total amount of oil in the pump, selecting one or more of the discharge ports to be operated under a load, and outputting a selection signal to each of corresponding ones of the solenoid valves.

According to the oil pressure control device described in this Japanese Patent Application Publication No. 3-213773 (JP-A-3-213773), the plurality of the discharge ports of the oil pump are selectively operated under a load. Therefore, the amount of oil in the pump can be constantly made appropriate, namely, coincident with the required amount of oil.

However, the oil pressure control device described in Japanese Patent Application Publication No. 3-213773 (JP-A-3-213773) is provided with the dedicated solenoid valves for allowing the discharge amount of the oil pump to be changed. Therefore, there is a problem in that the number of parts increases.

SUMMARY OF THE INVENTION

The invention provides an oil pressure supply device allowing the number of parts to be reduced.

An oil pressure supply device according to a first aspect of the invention has an oil pump for supplying an oil pressure to an oil passage from each of a first port and a second port. This oil pressure supply device includes a first solenoid valve, a second solenoid valve, a first switchover valve, a second switchover valve, and a third switchover valve. Each of the first solenoid valve and the second solenoid valve outputs an oil pressure. The first switchover valve makes a switchover between a state in which an oil pressure is supplied so as to engage a lockup clutch and a state in which an oil pressure is supplied so as to release the lockup clutch, in accordance with an oil pressure supplied from the first solenoid valve. The second switchover valve makes a switchover between supply sources of an oil pressure supplied to a component in accordance with an oil pressure supplied from the second solenoid valve when no oil pressure is supplied from the first solenoid valve, and selects a definite one of the supply sources as a supply source of an oil pressure supplied to the component regardless of whether or not an oil pressure is supplied from the second solenoid valve when an oil pressure is supplied from the first solenoid valve. The third switchover valve brings the first port and the oil passage into communication with each other when no oil pressure is supplied from at least one of the first solenoid valve and the second solenoid valve, and shuts off the first port from the oil passage when an oil pressure is supplied from each of the first solenoid valve and the second solenoid valve.

According to the foregoing aspect of the invention, an oil pressure is output from each of the first solenoid valve and the second solenoid valve. The first switchover valve makes a switchover between the state in which an oil pressure is supplied so as to engage the lockup clutch and the state in which an oil pressure is supplied so as to release the lockup clutch, in accordance with an oil pressure supplied from the first solenoid valve. The second switchover valve makes a switchover between the supply sources of an oil pressure supplied to the component in accordance with an oil pressure supplied from the second solenoid valve when no oil pressure is supplied from the first solenoid valve. The second switchover valve selects a definite one of the supply sources as a supply source of an oil pressure supplied to the component regardless of whether or not an oil pressure is supplied from the second solenoid valve, when an oil pressure is supplied from the first solenoid valve. The third switchover valve brings the first port and the oil passage into communication with each other when no oil pressure is supplied from at least one of the first solenoid valve and the second solenoid valve. The third switchover valve shuts off the first port from the oil passage when an oil pressure is supplied from each of the first solenoid valve and the second solenoid valve. Thus, a switchover from a state in which the first port of the oil pump communicates with the oil passage to a state in which the first port is shut off from the oil passage can be made without changing the supply source of the oil pressure supplied to the component. Therefore, the amount of oil discharged from the oil pump to the oil passage can be changed using the existing solenoid valves provided for the control of the oil pressure supplied to each of the lockup clutch and the component, without providing any dedicated solenoid valve. As a result, an oil pressure supply device allowing the number of parts to be reduced can be provided.

Furthermore, the third switchover valve shuts off the first port from the oil passage and brings a third port, which has a lower oil pressure than the oil passage, and the first port into communication with each other when an oil pressure is supplied from each of the first solenoid valve and the second solenoid valve.

According to the foregoing aspect of the invention, in shutting off the first port of the oil pump from the oil passage, the first port from which oil is discharged in the oil pump and the third port which has a lower oil pressure than the oil passage are brought into communication with each other. Thus, the load of the oil pump can be reduced.

The third port is a port for sucking in oil in the oil pump.

According to the foregoing aspect of the invention, in shutting off the first port of the oil pump from the oil passage, the first port from which oil is discharged in the oil pump and the third port into which oil is sucked are brought into communication with each other. Thus, the load of the oil pump can be reduced.

Furthermore, when an oil pressure is supplied from the first solenoid valve, the first switchover valve makes a switchover to the state in which an oil pressure is supplied so as to engage the lockup clutch.

According to the foregoing aspect of the invention, when an oil pressure is supplied from the first solenoid valve, the first switchover valve makes a switchover to the state in which an oil pressure is supplied so as to engage the lockup clutch. Thus, in supplying an oil pressure from each of the first solenoid valve and the second solenoid valve to the third switchover valve to shut off the first port of the oil pump from the oil passage, the lockup clutch can be held engaged. Therefore, the discharge amount of oil can be prevented from being further reduced when the speed of a vehicle is so low as to release the lockup clutch, namely, when the amount of oil discharged from the oil pump is small. As a result the oil pressure can be prevented from becoming insufficient.

The component is a frictional engagement element.

According to the foregoing aspect of the invention, a switchover between the supply sources of an oil pressure supplied to the frictional engagement element is made by the second switchover valve. In the oil pressure supply device thus constructed, the number of parts can be reduced.

BRIEF DESCRIPTION OF THE DRAWINGS

The foregoing and further objects, features and advantages of the invention will become apparent from the following description of an embodiment with reference to the accompanying drawings, wherein like numerals are used to represent like elements and wherein.

DETAILED DESCRIPTION OF EMBODIMENT

The embodiment of the invention will be described hereinafter with reference to the drawings. In the following description, like parts are denoted by like symbols. Those parts which are denoted by the same symbol are identical in name and function to one another. Therefore, detailed description of such parts will not be repeated.

Figure 1:
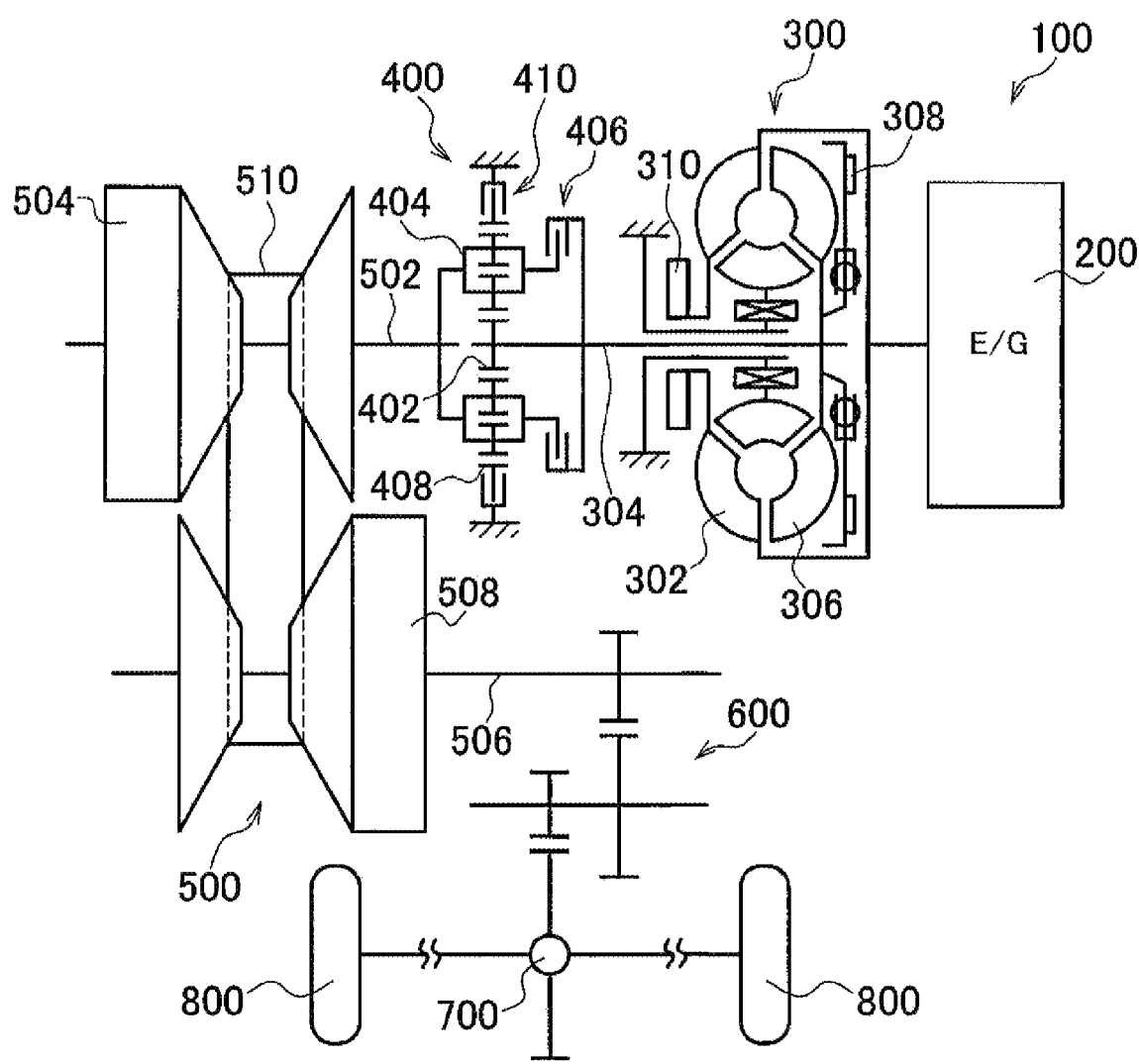
FIG. 1 is a schematic constructional diagram of a vehicle mounted with an oil pressure supply device according to an embodiment of the invention.

Referring to FIG. 1, a vehicle mounted with an oil pressure supply device according to the embodiment of the invention will be described. An output of an engine 200 of a driving system 100 mounted on this vehicle is input to a belt-type continuously variable transmission 500 via a torque converter 300 and a forward/backward changeover mechanism 400. An output of the belt-type continuously variable transmission 500 is transmitted to a reduction gear 600 and a differential gear mechanism 700 and then distributed to a right driving wheel 800 and a left driving wheel 800. The driving system 100 is controlled by an electronic control unit (ECU) 900, which will be described later.

The torque converter 300 is composed of a pump impeller 302 coupled to a crankshaft of the engine 200, and a turbine impeller 306 coupled to the forward/backward changeover mechanism 400 via a turbine shaft 304. A lockup clutch 308 is provided between the pump impeller 302 and the turbine impeller 306. The lockup clutch 308 is engaged or released through a switchover between the supply of an oil pressure to an engagement-side oil chamber and the supply of an oil pressure to a release-side oil chamber.

The pump impeller 302 and the turbine impeller 306 rotate integrally through complete engagement of the lockup clutch 308. The pump impeller 302 is provided with a mechanical oil pump 310 for generating an oil pressure for performing shift control of the belt-type continuously variable transmission 500, generating a belt clamping force, or supplying lubricating oil to respective portions.

The forward/backward changeover mechanism 400 is constructed as a double pinion-type planetary gear train. The turbine shaft 304 of the torque converter 300 is coupled to a sun gear 402. An input shaft 502 of the belt-type continuously variable transmission 500 is coupled to a carrier 404. The carrier 404 and the sun gear 402 are coupled to each other via a forward clutch 406. A ring gear 408 is fixed to a housing via a reverse brake 410. The forward clutch 406 and the reverse brake 410 are frictionally engaged by a hydraulic cylinder. The input rotational speed of the forward clutch 406 is equal to the rotational speed of the turbine shaft 304, namely, a turbine rotational speed NT.

The forward/backward changeover mechanism 400 assumes an engagement state for running forward through engagement of the forward clutch 406 and release of the reverse brake 410. In this state, a driving force in a forward running direction is transmitted to the belt-type continuously variable transmission 500. The forward/backward changeover mechanism 400 assumes an engagement state for running backward through engagement of the reverse brake 410 and release of the forward clutch 406. In this state, the input shaft 502 rotates reversely to the turbine shaft 304. A driving force in a backward running direction is thereby transmitted to the belt-type continuously variable transmission 500. When both the forward clutch 406 and the reverse brake 410 are released, the forward/backward changeover mechanism 400 assumes a neutral state in which the transmission of power is suspended.

The belt-type continuously variable transmission 500 is composed of a primary pulley 504 provided on the input shaft 502, a secondary pulley 508 provided on an output shaft 506, and a drive belt 510 wound around these pulleys. The transmission of power is carried out with the aid of frictional forces acting between the respective pulleys and the drive belt 510.

Each of the pulleys is provided with a hydraulic cylinder so that the groove width of each of the pulleys can be changed. The groove width of each of the pulleys changes through the control of an oil pressure in the hydraulic cylinder of the primary pulley 504. The hanging diameter of the drive belt 510 is thereby changed to cause continuous changes in a change gear ratio GR (=a rotational speed NIN of the primary pulley/a rotational speed NOUT of the secondary pulley).

Figure 2:
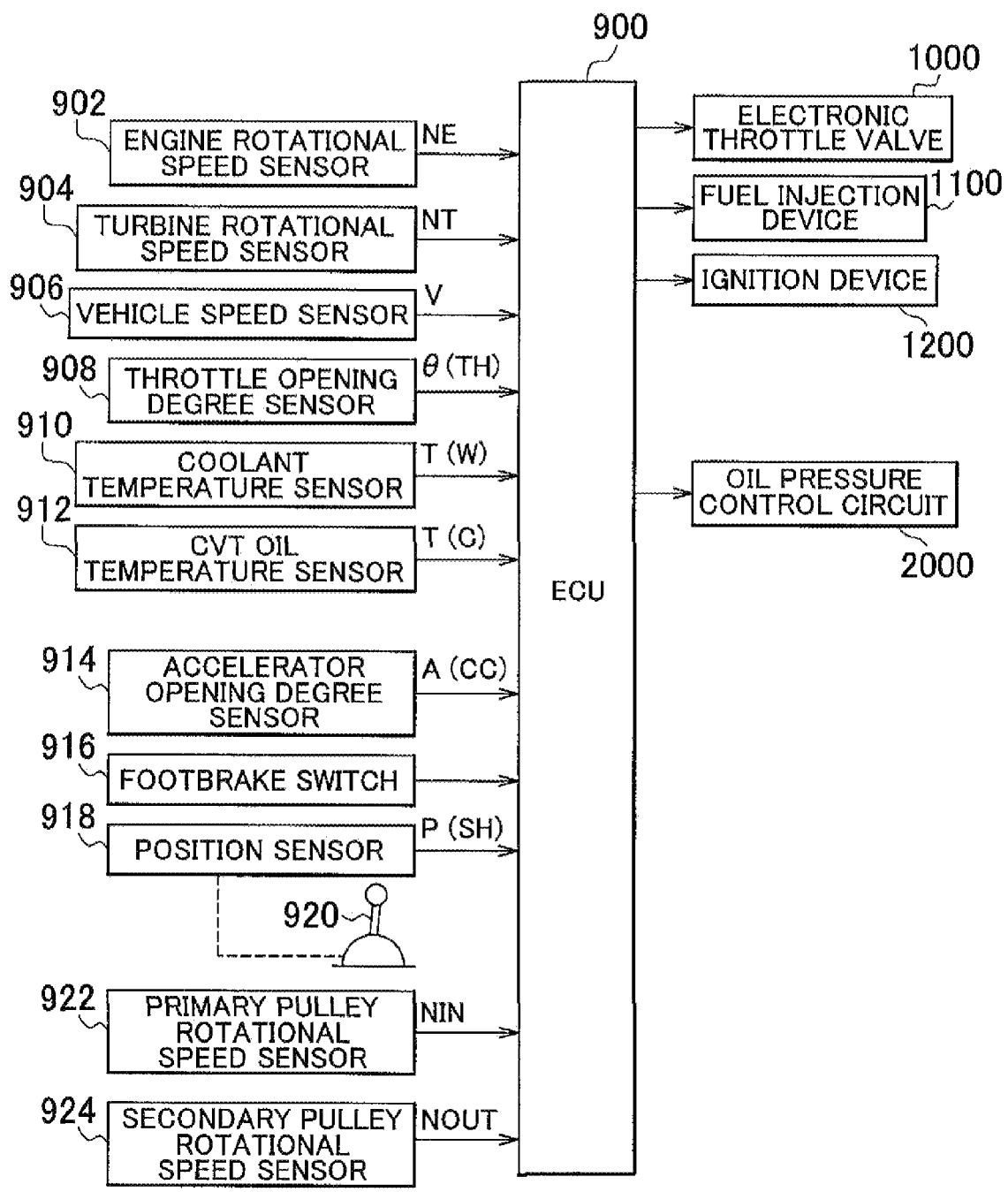
FIG. 2 is a control block diagram of an ECU.

As shown in FIG. 2, an engine rotational speed sensor 902, a turbine rotational speed sensor 904, a vehicle speed sensor 906, a throttle opening degree sensor 908, a coolant temperature sensor 910, an oil temperature sensor 912, an accelerator opening degree sensor 914, a footbrake switch 916, a position sensor 918, a primary pulley rotational speed sensor 922, and a secondary pulley rotational speed sensor 924 are connected to the ECU 900.

The engine rotational speed sensor 902 detects a rotational speed NE of the engine 200 (engine rotational speed). The turbine rotational speed sensor 904 detects a rotational speed NT of the turbine shaft 304 (turbine rotational speed). The vehicle speed sensor 906 detects a vehicle speed V. The throttle opening degree sensor 908 detects an opening degree θ (TH) of an electronic throttle valve. The coolant temperature sensor 910 detects a coolant temperature T (W) of the engine 200. The oil temperature sensor 912 detects an oil temperature T (C) of the belt-type continuously variable transmission 500 or the like. The accelerator opening degree sensor 914 detects an opening degree A (CC) of an accelerator pedal. The footbrake switch 916 detects whether or not a footbrake is operated. When a brake pedal is operated, the footbrake switch 916 is turned on. When the brake pedal is not operated, the footbrake switch 916 is turned off.

The position sensor 918 determines whether a contact provided at a position corresponding to a shift position is ON or OFF, thereby detecting a position P (SH) of a shift lever 920. The primary pulley rotational speed sensor 922 detects the rotational speed NIN of the primary pulley 504. The secondary pulley rotational speed sensor 924 detects the rotational speed NOUT of the secondary pulley 508. Signals indicating detection results of the respective sensors are transmitted to the ECU 900. The turbine rotational speed NT coincides with the primary pulley rotational speed NIN while running forward, namely, when the forward clutch 406 is engaged. The vehicle speed V assumes a value corresponding to the secondary pulley rotational speed NOUT. Accordingly, the turbine rotational speed NT is 0 when the vehicle is stopped and the forward clutch 406 is engaged.

The ECU 900 includes a central processing unit (CPU), a memory, an input/output interface, and the like. The CPU performs signal processings according to programs stored in the memory. The CPU thereby performs output control of the engine 200, shift control of the belt-type continuously variable transmission 500, belt clamping force control, engagement/release control of the forward clutch 406, engagement/release control of the reverse brake 410, and the like.

Output control of the engine 200 is performed by an electronic throttle valve 1000, a fuel injection device 1100, an ignition device 1200, and the like. Shift control of the belt-type continuously variable transmission 500, belt clamping force control, engagement/release control of the forward clutch 406, and engagement/release control of the reverse brake 410 are performed by an oil pressure control circuit 2000.

Part of the oil pressure control circuit 2000 will be described with reference to FIG. 3. An oil pressure generated by the oil pump 310 is supplied to a line-pressure oil passage 2002. The oil pressure in the line-pressure oil passage 2002 is regulated by a primary regulator valve 2100.

A control pressure is supplied from each of linear solenoid valves 2200 and 2210 to the primary regulator valve 2100. A spool of the primary regulator valve 2100 vertically slides in accordance with the supplied control pressure. Thus, the oil pressure in the line-pressure oil passage 2002 is regulated (adjusted) by the primary regulator valve 2100. The oil pressure regulated by the primary regulator valve 2100 is used as a line pressure PL. In this embodiment of the invention, the line pressure PL becomes higher as the control pressure supplied to the primary regulator valve 2100 becomes higher. It is also appropriate for the line pressure PL to become lower as the control pressure supplied to the primary regulator valve 2100 becomes higher.

Surplus oil that has flowed out (has been discharged) from the primary regulator valve 2100 flows into a secondary regulator valve 2102. A secondary pressure PSEC is produced by the secondary regulator valve 2102.

An oil pressure regulated by a first modulator valve 2310 is supplied to a linear solenoid valve 2200. An oil pressure regulated by a second modulator valve 2320 is supplied to a linear solenoid valve 2210. Each of the linear solenoid valve 2200 and the linear solenoid valve 2210 generates a control pressure in accordance with a current value that is determined by a duty signal transmitted from the ECU 900.

A third modulator valve 2330 outputs an oil pressure that has been regulated using the line pressure PL as an original pressure. The third modulator valve 2330 is provided with an axially movable spool and a spring for urging the spool toward one side. The third modulator valve 2330 is actuated using an output oil pressure of the linear solenoid valve 2210 as a pilot pressure. The oil pressure regulated by the third modulator valve 2330 is supplied to the hydraulic cylinder of the secondary pulley 508. A belt clamping force is increased/reduced in accordance with an output oil pressure from the third modulator valve 2330.

The linear solenoid valve 2210 is controlled such that the belt clamping force assumes such a value as prevents slippage of the drive belt 510, according to a map using the accelerator opening degree A (CC) and the change gear ratio GR as parameters. More specifically, an exciting current for the linear solenoid valve 2210 is controlled with a duty ratio corresponding to a belt clamping force. In the case where a sudden change in transmitted torque is caused during acceleration/deceleration or the like, the belt clamping force is corrected in an increasing direction to suppress the slippage of the belt.

A lockup control valve 2400 selectively switches over a destination to which the secondary pressure PSEC is supplied between an engagement-side oil chamber (the pump impeller 302 side) of the torque converter 300 and a release-side oil chamber (a space defined by the lockup clutch 308 and a cover) of the torque converter 300.

The lockup control valve 2400 is actuated in accordance with an oil pressure supplied from a first solenoid valve 2500. When no oil pressure is supplied from the first solenoid valve 2500 to the lockup control valve 2400, the spool of the lockup control valve 2400 assumes a state indicated by (A) (a state on the left side) in FIG. 3 due to an urging force of the spring.

In this case, the secondary pressure PSEC is supplied to the release-side oil chamber of the torque converter 300, and the oil pressure in the engagement-side oil chamber of the torque converter 300 is supplied to an oil cooler (not shown). Therefore, the lockup clutch 308 is detached from the cover and hence released.

Figure 3:
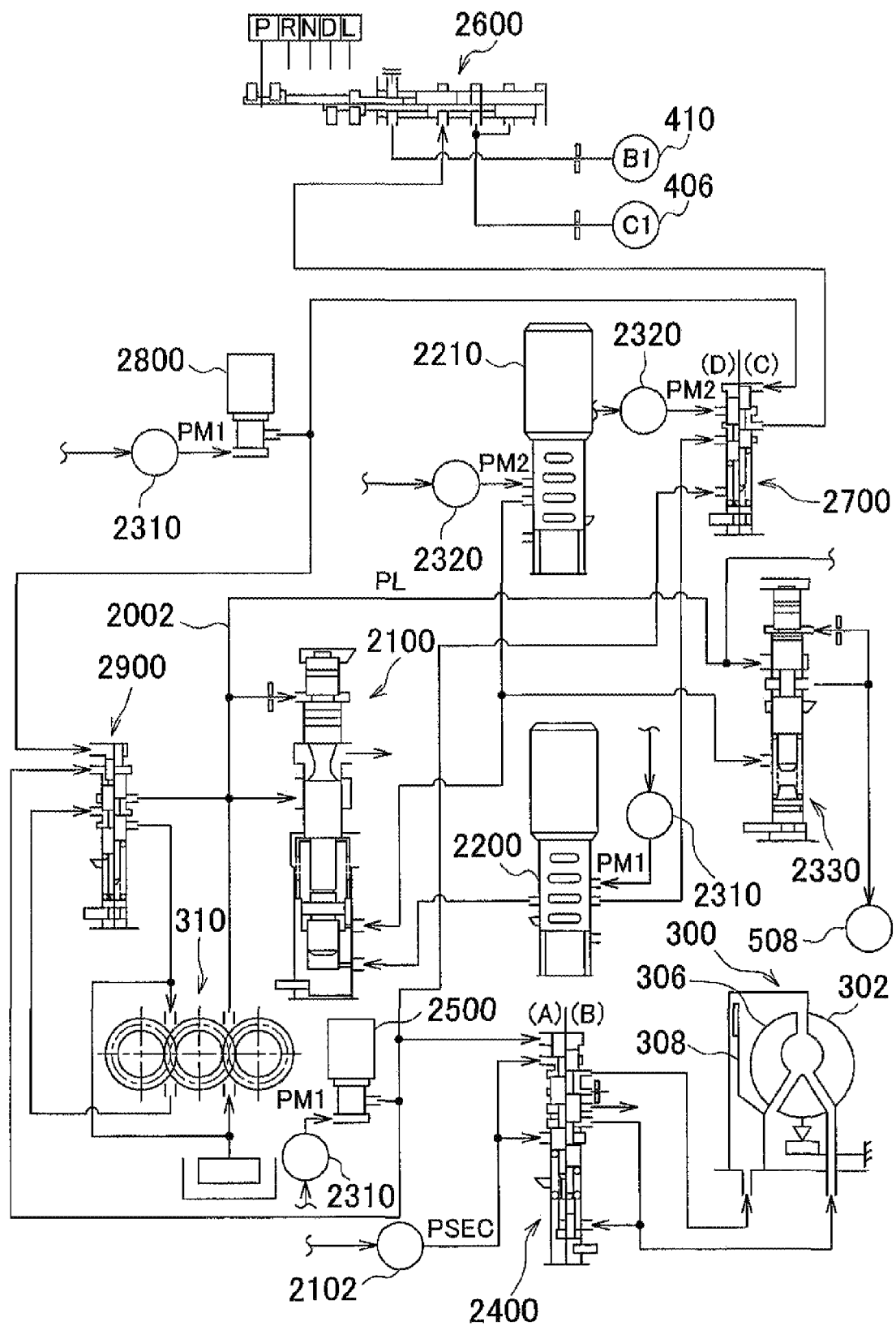
FIG. 3 is a diagram (no. 1) showing an oil pressure control circuit.

When an oil pressure is supplied from the first solenoid valve 2500 to the lockup control valve 2400, the spool of the lockup control valve 2400 assumes a state indicated by (B) (a state on the right side) in FIG. 3.

In this case, the secondary pressure PSEC is supplied to the engagement-side oil chamber of the torque converter 300, and an oil pressure is drained from the release-side oil chamber of the torque converter 300. Therefore, the lockup clutch 308 is pressed against the cover side and hence engaged. The engaging force of the lockup clutch 308 assumes a value corresponding to an oil pressure supplied from the first solenoid valve 2500 to the lockup control valve 2400.

The first solenoid valve 2500 outputs a pressure corresponding to a duty signal transmitted from the ECU 900. Accordingly, the engaging force of the lockup clutch 308 is controlled by the duty signal for the first solenoid valve 2500. It should be noted that this is not the only method of controlling the engaging force of the lockup clutch 308.

A manual valve 2600 is mechanically switched over in accordance with all operation of the shift lever 920. The forward clutch 406 and the reverse brake 410 are thereby engaged or released.

The shift lever 920 is operated to a "P" position for parking, an "R" position for running backward, an "N" position for suspending the transmission of power, a "D" position for running forward, and an "L" position for running forward.

At the "P" position and the "N" position, oil pressures in the forward clutch 406 and the reverse brake 410 are drained from the manual valve 2600. The forward clutch 406 and the reverse brake 410 are thereby released.

At the "R" position, an oil pressure is supplied from the manual valve 2600 to the reverse brake 410. The reverse brake 410 is thereby engaged. On the other hand, an oil pressure in the forward clutch 406 is drained from the manual valve 2600. The forward clutch 406 is thereby released.

At the "D" position and the "L" position, an oil pressure is supplied from the manual valve 2600 to the forward clutch 406. The forward clutch 406 is thereby engaged. On the other hand, an oil pressure in the reverse brake 410 is drained from the manual valve 2600. The reverse brake 410 is thereby released.

A garage shift control valve 2700 makes a switchover between supply sources of oil pressures supplied to the forward clutch 406 and the reverse brake 410, via the manual valve 2600.

When the garage shift control valve 2700 assumes a state indicated by (C) (a state on the right side) in FIG. 3, a modulator pressure supplied from the second modulator valve 2320 is supplied to the forward clutch 406 or the reverse brake 410 via the manual valve 2600.

When the garage shift control valve 2700 assumes a state indicated by (D) (a state on the left side) in FIG. 3, an oil pressure regulated by the linear solenoid valve 2200 is supplied to the forward clutch 406 or the reverse brake 410 via the manual valve 2600. The forward clutch 406 or the reverse brake 410 is gently engaged through regulation of the oil pressure by the linear solenoid valve 2200. As a result, a shock caused at the time of engagement is suppressed.

In the case where no oil pressure is supplied from the first solenoid valve 2500 to the garage shift control valve 2700, when an oil pressure is supplied from a second solenoid valve 2800 to the garage shift control valve 2700, the garage shift control valve 2700 is switched over to the state indicated by (D) in FIG. 3.

On the other hand, in the case where no oil pressure is supplied from the first solenoid valve 2500 to the garage shift control valve 2700, when the supply of the oil pressure from the second solenoid valve 2800 to the garage shift control valve 2700 is stopped, the garage shift control valve 2700 is switched over to the state indicated by (C) in FIG. 3 due to an urging force of the spring.

That is, when no oil pressure is supplied from the first solenoid valve 2500 to the garage shift control valve 2700, a switchover between the supply sources of oil pressures supplied to the forward clutch 406 and the reverse brake 410 is made in accordance with an oil pressure supplied from the second solenoid valve 2800.

For example, when a garage shift is made to operate the shift lever 920 from the "N" position to the "D" position or the "R" position, an oil pressure is supplied from the second solenoid valve 2800. Therefore, the linear solenoid valve 2200 serves as the supply source of an oil pressure supplied to the forward clutch 406 or the reverse brake 410.

In this case, the linear solenoid valve 2200 controls the engaging force of the forward clutch 406 or the reverse brake 410 such that the forward clutch 406 or the reverse brake 410 is gently engaged.

Meanwhile the supply of the oil pressure from the second solenoid valve 2800 to the garage shift control valve 2700 is stopped during steady running or the like. Therefore, the second modulator valve 2320 serves as the supply source of an oil pressure supplied to the forward clutch 406 or the reverse brake 410.

In the case where an oil pressure is supplied from the first solenoid valve 2500 to the garage shift control valve 2700, even when an oil pressure is supplied from the second solenoid valve 2800 to the garage shift control valve 2700, the garage shift control valve 2700 is maintained in the state indicated by (C) in FIG. 3.

Therefore, when an oil pressure is supplied from the first solenoid valve 2500 to the garage shift control valve 2700, the second modulator valve 2320 is selected as the supply source of oil pressures supplied to the forward clutch 406 and the reverse brake 410 regardless of whether or not an oil pressure is supplied from the second solenoid valve 2800.

The oil pump 310 and a port switchover valve 2900 will be described with reference to FIG. 4.

The oil pump 310 includes a driving gear 320, a first driven gear 321, a second driven gear 322, a first port 331, a second port 332, a third port 333, and a fourth port 334.

The first port 331 and the third port 333 are provided between the driving gear 320 and the first driven gear 321. Oil sucked in from the third port 333 is discharged from the first port 331. The second port 332 and the fourth port 334 are provided between the driving gear 320 and the second driven gear 322. Oil sucked in from the fourth port 334 is discharged from the second port 332.

Accordingly, oil pressures are supplied from the first port 331 and the second port 332 to the line-pressure oil passage 2002. Oil pressures at the third port 333 and the fourth port 334 are lower than an oil pressure in the line-pressure oil passage 2002, namely, a line pressure.

The port switchover valve 2900 includes a first port 2910, a second port 2920, a third port 2930, a fourth port 2940, a fifth port 2950, and a spring 2960.

An oil pressure is supplied from the first solenoid valve 2500 to the first port 2910. An oil pressure is supplied from the second solenoid valve 2800 to the second port 2920. An oil pressure is supplied from the first port 331 of the oil pump 310 to the third port 2930.

Figure 4:
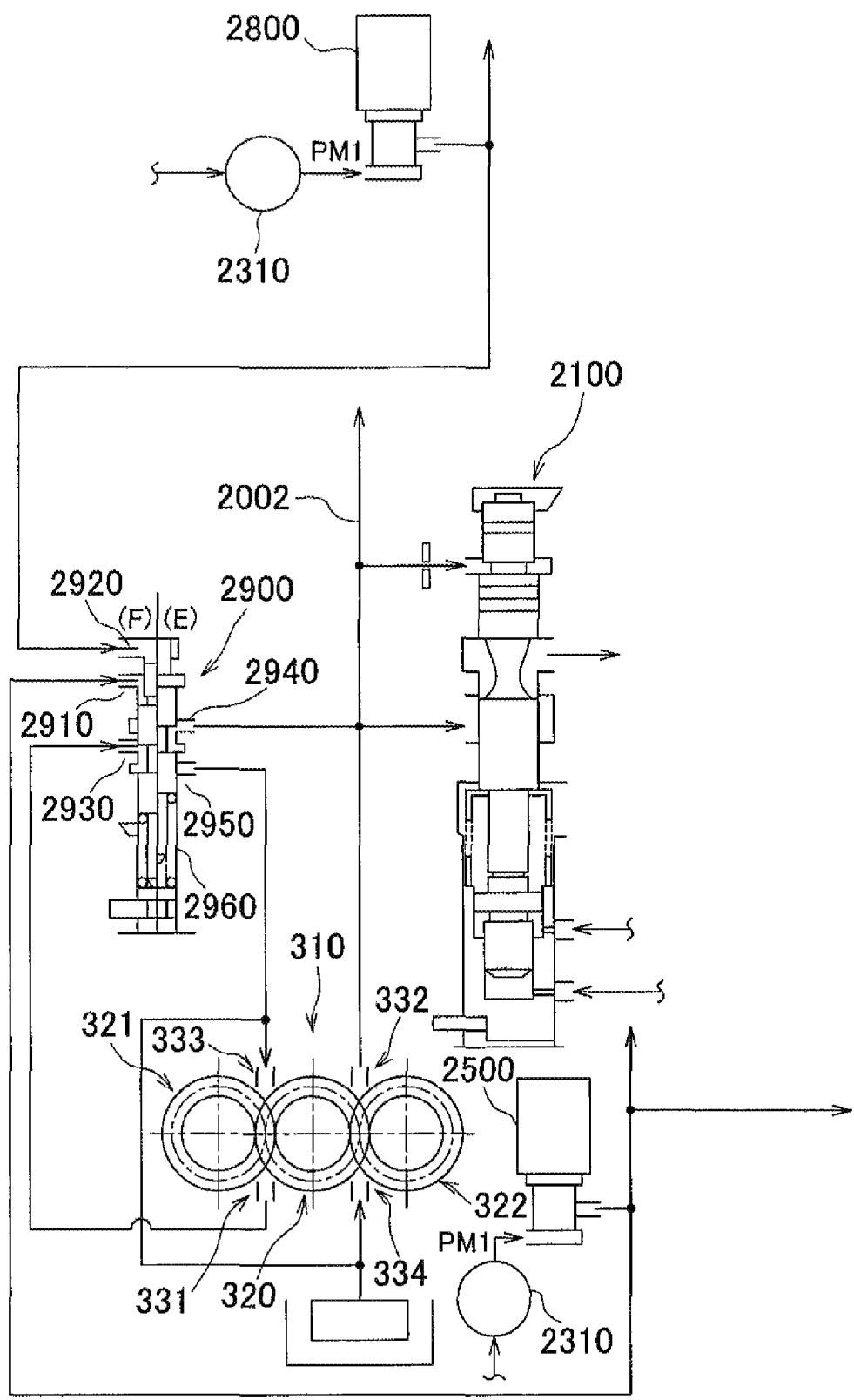
FIG. 4 is a diagram (no. 2) showing the oil pressure control circuit.

The oil pressure supplied to the third port 2930 is supplied from the fourth port 2940 to the line-pressure oil passage 2002 when the port switchover valve assumes a state indicated by (E) (a state on the right side) in FIG. 4. That is, when the port switchover valve 2900 assumes the state indicated by (E) in FIG. 4, the first port 331 of the oil pump 310 and the line-pressure oil passage 2002 are in communication with each other.

When the port switchover valve 2900 assumes a state indicated by (F) (a state on the left side) in FIG. 4, an oil pressure supplied to the third port 2930 is returned from the fifth port 2950 to the third port 333 of the oil pump 310. That is, when the port switchover valve 2900 assumes the state indicated by (F) in FIG. 4, the first port 331 of the oil pump 310 is shut off from the line-pressure oil passage 2002, and the first port 331 and the third port 333 are in communication with each other.

The spring 2960 urges a spool of the port switchover valve 2900 such that the port switchover valve 2900 assumes the state indicated by (E) in FIG. 4. The urging force of the spring 2960 is set such that the port switchover valve 2900 assumes the state indicated by (F) in FIG. 4 when an oil pressure is supplied from the first solenoid valve 2500 to the first port 2910 and an oil pressure is supplied from the second solenoid valve 2800 to the second port 2920.

Accordingly, when no oil pressure is supplied from at least one of the first solenoid valve 2500 and the second solenoid valve 2800, the port switchover valve 2900 assumes the state indicated by (E) in FIG. 4 due to the urging force of the spring 2960.

It is determined whether to switch over the state of the port switchover valve 2900 or not, on the basis of, for example, a map having the engine rotational speed NE and oil pressure as parameters.

The operation of the oil pressure control circuit as the oil pressure supply device according to this embodiment of the invention, which is based on the above-described structure, will be described.

During operation of the engine 200, the oil pump 310 is driven, and oil pressures are supplied from the first port 331 and the second port 332 of the oil pump 310 to the line-pressure oil passage. The rotational speed of the driving gear 320 of the oil pump 310 is low when the engine rotational speed NE is low.

In such a state, the supply of an oil pressure from at least one of the first solenoid valve 2500 and the second solenoid valve 2800 is stopped. Therefore, the port switchover valve 2900 assumes the state indicated by (E) in FIG. 4. Accordingly, the first port 331 of the oil pump 310 and the line-pressure oil passage 2002 are in communication with each other. Therefore oil pressures are supplied from both the first port 331 and the second port 332 to the line-pressure oil passage 2002. In consequence, an oil pressure needed to actuate the forward/backward changeover mechanism 400 and the belt-type continuously variable transmission 500 is ensured.

On the other hand, when the rotational speed of the driving gear 320 of the oil pump 310 rises as the engine rotational speed NE rises, the amount of oil discharged from the oil pump 310 increases. Therefore, the amount of energy loss resulting from the driving of the oil pump 310 increases.

In a state in which the amount of oil discharged from the oil pump 310 is large, the oil pressure needed to actuate the forward/backward changeover mechanism 400 and the belt-type continuously variable transmission 500 can be ensured even when only one of the first port 331 and the second port 332 serves as a port for supplying an oil pressure to the line-pressure oil passage 2002.

Thus, with a view to reducing the load imposed by the oil pump 310, oil pressures are output from the first solenoid valve 2500 and the second solenoid valve 2800. More specifically, an oil pressure is first output from the first solenoid valve 2500 to engage the lockup clutch 308, and an oil pressure is then output from the second solenoid valve 2800.

Thus, with the port switchover valve 2900 assuming the state indicated by (F) in FIG. 4, the first port 331 of the oil pump 310 can be shut off from the line-pressure oil passage 2002 and the first port 331 and the third port 333 of the oil pump 310 can be brought into communication with each other. Therefore, oil discharged from the first port 331 of the oil pump 310 can be returned to the third port 333. As a result, the load imposed by the oil pump 310 can be reduced.

Incidentally, in ensuring that the port switchover valve 2900 assumes the state indicated by (F) in FIG. 4, an oil pressure is first output from the first solenoid valve 2500, and an oil pressure is then output from the second solenoid valve 2800. Thus, the garage shift control valve 2700 can be maintained in the state indicated by (C) in FIG. 3. In other words, the second modulator valve 2320 can be maintained as the supply source of an oil pressure supplied to the forward clutch 406 or the reverse brake 410. Therefore, in switching over the state of the port switchover valve 2900, the supply source of the oil pressure supplied to the forward clutch 406 or the reverse clutch 410 can be kept unchanged.

A switchover in the state of the port switchover valve 2900 is made when an oil pressure is output from the first solenoid valve 2500, namely, when the lockup clutch 308 is engaged. Thus, the first port 331 of the oil pump 310 can be prevented from being shut off from the line-pressure oil passage 2002 when the speed of the vehicle is so low as to release the lockup clutch 308, namely, when the amount of oil discharged from the oil pump 310 is small. Therefore, the oil pressure supplied to the line-pressure oil passage 2002 can be prevented from becoming insufficient.

As described above, according to the oil pressure supply device according to this embodiment of the invention, the lockup control valve makes a switchover between the state in which the secondary pressure PSEC is supplied to the engagement-side oil chamber of the torque converter and the state in which the secondary pressure PSEC is supplied to the release-side oil chamber of the torque converter, in accordance with an oil pressure supplied from the first solenoid valve. The garage shift control valve makes a switchover between the supply sources of an oil pressure supplied to the forward clutch or the reverse brake in accordance with an oil pressure supplied from the second solenoid valve when no oil pressure is supplied from the first solenoid valve. The garage shift control valve maintains the supply source of an oil pressure supplied to each of the forward clutch and the reverse brake when an oil pressure is supplied from the first solenoid valve. The port switchover valve brings the first port of the oil pump and the line-pressure oil passage into communication with each other so as to supply oil pressures from both the first port and the second port of the oil pump to the line-pressure oil passage when no oil pressure is supplied from at least one of the first solenoid valve and the second solenoid valve. The port switchover valve shuts off the first port of the oil pump from the line-pressure oil passage when oil pressures are supplied from both the first solenoid valve and the second solenoid valve. Thus, a switchover from a state in which the first port of the oil pump is in communication with the oil passage to a state in which the first port is shut off from the oil passage can be made while maintaining the supply source of an oil pressure supplied to the forward clutch or the reverse brake. Therefore, the amount of oil discharged from the oil pump to the line-pressure oil passage can be changed using the existing solenoid valves, namely, the first solenoid valve and the second solenoid valve, without providing any dedicated solenoid valve. As a result, the number of parts can be reduced.

Instead of bringing the first pot 331 and the third port 333 of the oil pump 310 into communication with each other using the port switchover valve 2900, it is also appropriate to bring a port having a lower pressure than the line-pressure oil passage 2002, such as a drain port for returning oil into an oil pan, a lubrication port coupled to a lubrication system, or the like, and the first port 331 into communication with each other.

The embodiment of the invention disclosed this time is an exemplification in every respect and not limitative. The scope of the invention is not defined by the foregoing description but by the claims. The invention is intended to incorporate all modifications that are equivalent in sense and range to the claims.

What is claimed is:

1. An oil pressure supply device comprising:
   a first solenoid valve and a second solenoid valve that output an oil pressure for control,
   a first switchover valve that makes a switchover between a state in which an oil pressure is supplied to engage a lockup clutch in accordance with an oil pressure supplied from the first solenoid valve;
   a second switchover valve that makes a switchover between supply sources of an oil pressure supplied to a component in accordance with oil pressures supplied from the second solenoid valve when no oil pressure is supplied from the first solenoid valve, and selects the same supply source, as a supply source of the oil pressure supplied to the component regardless of whether or not an oil pressure is supplied from the second solenoid valve when an oil pressure is supplied from the first solenoid valve; and;
   an oil pump equipped with a first port and a second port for supplying an oil pressure to an oil passage;
   a third switchover valve that makes brings the first port and the oil passage into communication with each other when no oil pressure is supplied from at least one of the first solenoid valve and the second solenoid valve, and shuts off the first port from the oil passage when the oil pressure is supplied from each of the first solenoid valve and the second solenoid valve.

2. The oil pressure supply device according to claim 1, wherein the oil pump is equipped with a third port that has a lower oil pressure than the oil passage; and
   the third switchover valve shuts off the first port from the oil passage and brings the third port and the first port into communication with each other when an oil pressure is supplied from each of the first solenoid valve and the second solenoid valve.

3. The oil pressure supply device according to claim 2, wherein the third port is a port for sucking in oil in the oil pump.

4. The oil pressure supply device according to claim 1, wherein the first switchover valve makes a switchover to the state in which an oil pressure is supplied so as to engage the lockup clutch, when an oil pressure is supplied from the first solenoid valve.

5. The oil pressure supply device according to claim 1, wherein the component is a frictional engagement element.

* * * * *